(12) United States Patent
Dempsey

(10) Patent No.: US 10,215,431 B2
(45) Date of Patent: Feb. 26, 2019

(54) COMPACT AIR HANDLER WITH MULTIPLE FANS

(71) Applicant: Carrier Corporation, Farmington, CT (US)

(72) Inventor: Daniel J. Dempsey, Carmel, IN (US)

(73) Assignee: CARRIER CORPORATION, Farmington, CT (US)

( * ) Notice: Subject to any disclaimer, the term of this patent is extended or adjusted under 35 U.S.C. 154(b) by 706 days.

(21) Appl. No.: 14/161,849

(22) Filed: Jan. 23, 2014

(65) Prior Publication Data

US 2014/0260408 A1    Sep. 18, 2014

Related U.S. Application Data

(60) Provisional application No. 61/802,998, filed on Mar. 18, 2013.

(51) Int. Cl.

| F24D 5/00 | (2006.01) |
|---|---|
| F24F 7/007 | (2006.01) |
| F24F 3/044 | (2006.01) |
| F24H 3/04 | (2006.01) |
| F24H 3/08 | (2006.01) |
| F24H 3/12 | (2006.01) |
| F24H 9/20 | (2006.01) |
| F24D 5/02 | (2006.01) |
| F24D 5/12 | (2006.01) |

(52) U.S. Cl.
CPC ............. *F24F 7/007* (2013.01); *F24D 5/02* (2013.01); *F24D 5/12* (2013.01); *F24F 3/0442* (2013.01); *F24F 3/0444* (2013.01); *F24H 3/0411* (2013.01); *F24H 3/08* (2013.01); *F24H 3/12* (2013.01); *F24H 9/2064* (2013.01); *F24D 2200/08* (2013.01); *F24D 2200/12* (2013.01); *F24F 2221/54* (2013.01)

(58) Field of Classification Search
None
See application file for complete search history.

(56) References Cited

U.S. PATENT DOCUMENTS

| 3,025,382 | A | * | 3/1962 | Eisele | F24H 3/0405 |
|---|---|---|---|---|---|
| | | | | | 219/532 |
| 3,977,467 | A | * | 8/1976 | Northrup, Jr. | F24H 3/0405 |
| | | | | | 165/122 |
| 4,175,699 | A | * | 11/1979 | Engeling | F24D 19/1084 |
| | | | | | 126/110 R |
| 4,531,573 | A | * | 7/1985 | Clark | F24F 3/0442 |
| | | | | | 165/216 |
| 4,673,029 | A | * | 6/1987 | Beachboard | F24F 3/0527 |
| | | | | | 165/217 |
| 4,716,957 | A | * | 1/1988 | Thompson | F24F 3/001 |
| | | | | | 165/11.1 |
| 4,767,262 | A | | 8/1988 | Simon | |
| 4,915,294 | A | * | 4/1990 | Wylie | F24F 7/065 |
| | | | | | 236/49.3 |

(Continued)

FOREIGN PATENT DOCUMENTS

JP    2002147812 A    5/2002

*Primary Examiner* — Thor Campbell
(74) *Attorney, Agent, or Firm* — Cantor Colburn LLP

(57) ABSTRACT

An air handler configured with a plurality of air distribution modules, each including a fan, and at least one damper disposed within to provide and direct conditioned air or fresh air to respective multiple zones of a building.

11 Claims, 2 Drawing Sheets

(56) References Cited

U.S. PATENT DOCUMENTS

| | | | | |
|---|---|---|---|---|
| 5,069,113 | A | 12/1991 | Mattson et al. | |
| 5,123,592 | A * | 6/1992 | Desmarais | F24F 11/04 137/486 |
| 5,180,102 | A * | 1/1993 | Gilbert | F24F 11/053 165/212 |
| 5,251,815 | A * | 10/1993 | Foye | G05D 7/0635 236/49.3 |
| 5,271,558 | A * | 12/1993 | Hampton | F24F 13/06 236/49.3 |
| 5,398,159 | A | 3/1995 | Andersson et al. | |
| 5,413,165 | A * | 5/1995 | Wylie | F24F 3/044 165/208 |
| 5,413,278 | A * | 5/1995 | Erikson | F24F 3/044 137/802 |
| 5,632,677 | A | 5/1997 | Elkins | |
| 5,664,995 | A | 9/1997 | O'Keefe | |
| 6,072,397 | A | 6/2000 | Ostrowski | |
| 6,079,626 | A * | 6/2000 | Hartman | F24F 3/044 236/13 |
| 6,386,969 | B1 | 5/2002 | O'Brien | |
| 6,427,454 | B1 * | 8/2002 | West | F24F 3/153 62/176.1 |
| 6,554,697 | B1 | 4/2003 | Koplin | |
| 6,792,766 | B2 | 9/2004 | Osborne et al. | |
| 6,932,696 | B2 | 8/2005 | Schwartz et al. | |
| 6,950,606 | B2 * | 9/2005 | Logan | F24F 1/0007 392/360 |
| 6,981,383 | B2 * | 1/2006 | Shah | F24F 3/0442 165/11.2 |
| 7,137,775 | B2 | 11/2006 | Hopkins | |
| 7,347,774 | B2 * | 3/2008 | Aronstam | F24F 11/0001 236/49.3 |
| 7,406,835 | B2 | 8/2008 | Allen et al. | |
| 7,770,806 | B2 * | 8/2010 | Herzon | F24F 11/0012 236/1 C |
| 8,117,012 | B2 | 2/2012 | Vinson et al. | |
| 8,348,732 | B2 * | 1/2013 | Aronstam | F24F 3/00 236/49.1 |
| 8,837,922 | B2 * | 9/2014 | Mulder | F24D 5/02 392/347 |
| 9,121,620 | B2 * | 9/2015 | Rohde | F24F 13/10 |
| 9,261,283 | B2 * | 2/2016 | Mulder | F24D 5/02 |
| 2005/0155365 | A1 * | 7/2005 | Shah | F24F 3/0442 62/186 |
| 2005/0156054 | A1 * | 7/2005 | Shah | F24F 3/0442 236/49.3 |
| 2007/0146994 | A1 * | 6/2007 | Germagian | H05K 7/20745 361/695 |
| 2008/0202138 | A1 * | 8/2008 | Pabisz | B63J 2/04 62/240 |
| 2010/0307733 | A1 * | 12/2010 | Karamanos | F24F 11/006 165/254 |
| 2012/0168119 | A1 * | 7/2012 | Dunnavant | F24F 3/14 165/59 |
| 2013/0023198 | A1 * | 1/2013 | Badenhorst | F24F 13/06 454/269 |
| 2014/0318733 | A1 * | 10/2014 | Bagwell | F24F 13/26 165/11.1 |
| 2015/0323213 | A1 * | 11/2015 | Rohde | F24F 13/10 165/212 |

* cited by examiner

COMPACT AIR HANDLER WITH MULTIPLE FANS

CROSS REFERENCE TO RELATED APPLICATIONS

The present application is related to, and claims the priority benefit of, U.S. Provisional Patent Application Ser. No. 61/802,998 filed Mar. 18, 2013, the contents of which are hereby incorporated in their entirety into the present disclosure.

TECHNICAL FIELD OF THE DISCLOSED EMBODIMENTS

The presently disclosed embodiments generally relate to heating and cooling systems. More particularly, the embodiments relate to an air handler with multiple fans within a ducted building.

BACKGROUND OF THE DISCLOSED EMBODIMENTS

In a typical ducted heating, ventilation, and air conditioning ("HVAC") system, a single blower in an indoor air handler circulates air to various parts of a building through a system of ducts. In a typical zoned HVAC system, the ducts are divided into several zones, one for each part of a building that is desired to be controlled independently of the other zones. Zoned HVAC systems require a large plenum with smaller duct branches feeding conditioned air from the plenum to the interior space. A set of dampers are field installed into the duct branches, downstream of the supply plenum, with at least one damper for each zone. These dampers can be opened or closed, to direct more or less air to a particular zone as needed to satisfy the desired comfort level in that zone.

SUMMARY OF THE DISCLOSED EMBODIMENTS

In one embodiment of an air handler with multiple fans, the air handler includes a first enclosure and a plurality of air distribution modules affixed to the first enclosure. The air handler includes a controller to operate at least one of the plurality of air distribution modules in response to a demand to provide conditioned air or fresh air. The air handler includes a coil disposed within the first enclosure to allow a liquid to flow therethrough. Each of the plurality of air distribution modules are in electrical communication with the controller. Each of the plurality of air distribution modules includes a second enclosure with a damper and a fan disposed within the second enclosure. In another aspect, each of the plurality of air distribution modules includes an electrical heating element, disposed within the second enclosure. In response to a demand to condition an interior zone, the controller determines which of the plurality of air distribution modules will satisfy the demand. The controller operates the damper and the fan to circulate conditioned or fresh air from the first enclosure through the second enclosure of at least one of the plurality of air distribution modules to an air distribution conduit system of a building.

In another embodiment, a HVAC system includes an air handler with multiple fans operating at least one of a plurality of air distribution modules affixed to the air handler. The HVAC system includes an outdoor unit assembly operably coupled to the air handler, wherein the outdoor unit assembly is either a heat pump or an air conditioner. In another aspect, the HVAC system includes a ventilation device.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE ENCLOSED EMBODIMENTS

Figure 1:
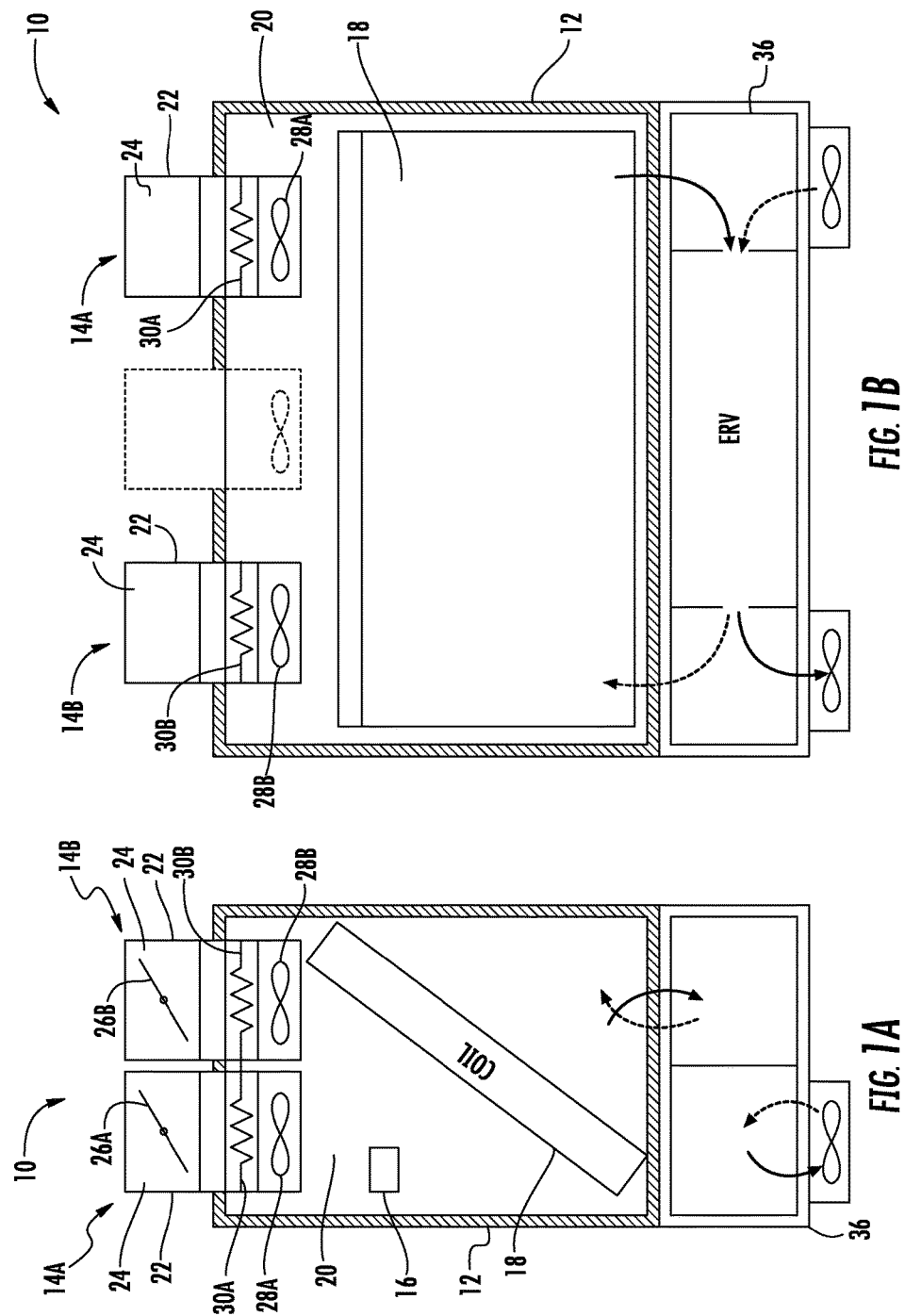
FIGS. 1A and B schematically illustrate, respectively, a front view and a side view of an air handler with multiple fans with panels removed to show interior components therein.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

FIGS. 1A and B illustrate an embodiment of an air handler with multiple fans, generally indicated at 10. The front and side walls of the air handler 10 have been removed to illustrate the interior components of the air handler 10. Air handler 10 includes a first enclosure 12 to contain the components therein, and a plurality of air distribution modules 14 affixed to the first enclosure 12. Air handler 10 also includes a controller 16 to operate at least one of the plurality of air distribution modules 14. Air handler 10 further includes a coil 18 disposed within the first enclosure 12 to allow a liquid to flow therethrough.

The first enclosure 12 contains a first interior volume 20. In one embodiment, a ventilation device 36 is operatively coupled to air handler 10 to draw fresh air into the first interior volume 20 through a first air inlet opening (not shown). A second air inlet opening (not shown) may be provided in the air handler first enclosure 12. The second air inlet opening can be covered by an air filter, to name one non-limiting example, that allows ambient air in the environment surrounding the first enclosure 12 to easily pass through the opening and enter the first interior volume 20. Air handler 10 includes the coil 18 disposed within the first enclosure 12. The coil 18 allows a liquid to flow therethrough when responding to a demand for conditioning an interior zone. The coil 18 may be composed of copper or aluminum, and arranged in a tube and fin configuration, to name just a few non-limiting examples.

Each of the plurality of air distribution modules 14 includes a second enclosure 22 enclosing a second interior volume 24. The second enclosure 22 is adapted for communication of an air distribution stream from the first interior volume 20 to the second interior volume 24. The second enclosure 22 is further adapted for communication of an air distribution stream from the second interior volume 24 to an external environment of the first enclosure 12 and second enclosure 22.

The front and side walls of each of the plurality of air distribution modules 14 has been removed to illustrate the interior components therein. In an exemplary embodiment, each of the plurality of air distribution modules 14 includes a damper 26 disposed within the second enclosure 22. Damper 26 may be of any desired shape, such as a rectangular, square, or oval shape blade, composed of any desired material, such as aluminized steel or stainless steel, to name just a few non-limiting examples. Damper 26 operates between an open and a closed position, and a number of positions therebetween, to regulate an amount of air allowed to flow through the second interior volume 24. In an exemplary embodiment, each of the plurality of air distribution modules 14 includes a fan 28 disposed within the second enclosure 22. Fan 28 may be a brushless direct-current powered axial fan, to name just one non-limiting example. Fan 28 operates to circulate air through the second interior volume 24.

In one embodiment, each of the plurality of air distribution modules 14 includes an electrical heating element 30 disposed within the second enclosure 22 for providing auxiliary heating. In one embodiment, the electrical heating element 30 is a nickel chromium conductive wire, to name just one non-limiting example.

A controller 16 is provided in communication, such as electrical communication, with each of the plurality of air distribution modules 14. Controller 16 may be disposed within first enclosure 12. In one embodiment, the controller 16 includes a microprocessor, pre-programmed with software stored in non-volatile memory for executing instructions to operate the air handler 10.

Figure 2:
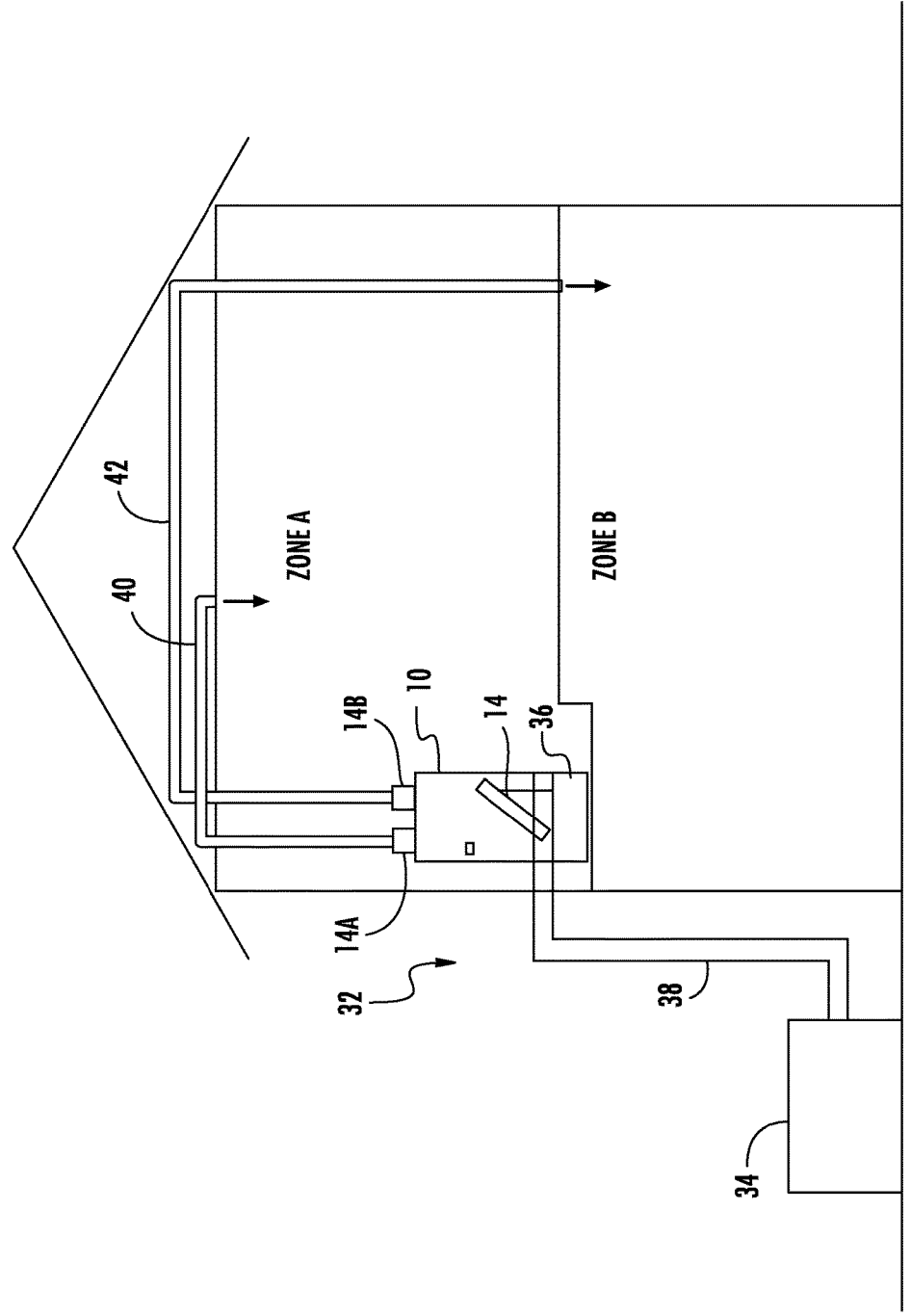
FIG. 2 schematically illustrates an HVAC system using an air handler with multiple fans.

FIG. 2 illustrates an embodiment of a HVAC system, generally indicated at 32 The HVAC system 32 includes an air handler with multiple fans 10 operatively coupled to an outdoor unit assembly 34 via conduits 38. The air handler 10 and the outdoor unit assembly 34 are configured to circulate a refrigerant therethrough. In one embodiment, outdoor unit assembly unit 34 may be a heat pump, while in another embodiment, outdoor unit assembly 34 may be an air conditioner, to name just two non-limiting examples. In one embodiment, the HVAC system 32 includes conduits 40 and 42 coupled to air distribution modules 14A and 14B respectively, of air handler 10 to distribute air into different interior zones. It will be appreciated by those skilled in the art that there may be more than two air distribution modules and more than two conduits depending on the configuration of the interior zones. In another embodiment, the HVAC system 32 includes a ventilation device 36 operatively coupled to the air handler 10.

In an exemplary embodiment of HVAC system 32, controller 16 receives a signal from a sensor designating a demand to condition an interior zone. The demand to condition an interior zone may come from Zone A, Zone B, or both. It will be appreciated by those skilled in the art that there may be more than two zones designating a demand call to condition an interior zone. For the purpose of illustration, it is designated that Zone A initiated a demand call. If a demand was initiated from Zone B, the system 32 would operate in similar fashion. Controller 16 sends a signal to the outdoor unit assembly 34 to begin circulating the refrigerant through a conduit circuit 38 to the coil 18. Once the refrigerant has circulated through the coil 18 for a specified period of time, controller 16 sends an electrical signal to damper 26A to be placed in an open position. Controller 16 sends an electrical signal to begin rotating fan 28A to circulate air. Fan 28A circulates the conditioned air from the first interior volume 20 through the second interior volume 24 to the desired zone, via conduit 40, to satisfy the demand. After the demand is satisfied, controller 16 sends an electrical signal to remove power from fan 28A. Controller 16 also sends an electrical signal to place damper 26A into a closed position. Controller 16 additionally sends an electrical signal to the outdoor unit assembly 34 to stop circulating the refrigerant.

If auxiliary heating is required, power is supplied to the electrical heating element 30A. Controller 16 sends a signal to damper 26A to be placed in an open position. Controller 16 also sends a signal to begin rotating fan 28A to circulate air. Fan 28A circulates the conditioned air through the second interior volume 24 to the desired zone, via conduit 40, to satisfy the demand. After the demand is satisfied, controller 16 sends an electrical signal to remove power from the electrical heating element 30A. Controller 16 also sends an electrical signal to remove power from fan 28A. Controller 16 additionally sends an electrical signal to place damper 26A in a closed position.

In another embodiment of HVAC system 32, if more than one zone is designating a demand to condition the interior zone, controller 16 will operate each of the plurality of air distribution modules 14A and 14B in the manner described herein.

In another embodiment of HVAC system 32, system 32 circulates fresh air through an interior zone by adding ventilator device 36. Controller 16 sends a signal to ventilation device 36 to begin operating fans therein to pull fresh air into the device while simultaneously exhausting stale air from the interior space. Controller 16 also sends a signal to damper 26A to be placed in an open position. Controller 16 additionally sends a signal to begin rotating fan 28A. Fan 28A circulates the fresh air, pulled from the ventilation device 36, from the first interior volume 20 through the second interior volume 24 to the desired zone to satisfy the demand. After the demand is satisfied, controller 16 sends an electrical signal to ventilation device 36 to stop operating. Controller 16 also sends an electrical signal to remove power from fan 28A. Controller 16 additionally sends a signal to place damper 26A in a closed position. If more than one zone is designating a demand to provide fresh air to the interior zone, controller 16 will operate each of the plurality of air distribution modules 14A and 14B in the manner described herein.

It will be appreciated that, air handler 10 can satisfy a demand for conditioned or fresh air within two or more interior zones by operating an air distribution module 14 associated with each interior zone. Air handler 10 operates a fan 28 and a damper 26, within each air distribution module 14, to direct and circulate conditioned or fresh air to each interior zone.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:
1. An air handler comprising:
a first enclosure having a first interior volume;
a plurality of air distribution modules affixed to the first enclosure; and
a controller in operable communication with at least one of the plurality of air distribution modules; wherein each of the plurality of air distribution modules comprises:
a second enclosure having a second interior volume, an upstream end, and a downstream end, the second enclosure configured to be coupled to a conduit, wherein the conduit is to be downstream of the downstream end of the second enclosure; and a fan disposed within the second enclosure at the upstream end of the second enclosure, wherein the controller is operative to cause the fan to move air through the second enclosure, wherein the fan disposed within the second enclosure is positioned within the first interior volume of the first enclosure.

2. The air handler of claim 1, wherein each of the plurality of air distribution modules comprises:

a damper disposed within the second enclosure;

wherein the second enclosure is adapted for communication of a distribution air stream from the first interior volume to the second interior volume; and wherein the second enclosure is adapted for communication of a distribution air stream from the second interior volume to an environment exterior of the first and second enclosures.

3. The air handler of claim 2, wherein the controller is operative to cause the damper to move between an open and a closed position, and a number of positions therebetween.

4. The air handler of claim 2, wherein the each of the plurality of air distribution modules further comprises an electrical heating element disposed within the second enclosure.

5. The air handler of claim 4, wherein the controller is operative to cause the electrical heating element to provide auxiliary heat within the second enclosure.

6. The air handler of claim 1, wherein the controller is in electrical communication with each of the plurality of air distribution modules.

7. The air handler of claim 1, wherein the plurality of air distribution modules comprises two air distribution modules.

8. The air handler of claim 1, wherein the controller is operative to receive a request to condition an interior zone and selects at least one air distribution module to condition the interior zone.

9. The air handler of claim 1, further comprising a coil disposed within the first enclosure.

10. The air handler of claim 9, wherein the coil is configured to allow a liquid to flow therethrough.

11. The air handler of claim 1, wherein the upstream end of the second enclosure is disposed adjacent to the first enclosure.

* * * * *